United States Patent [19]

Goldberg

[11] Patent Number: 5,006,773
[45] Date of Patent: Apr. 9, 1991

[54] MICROCOMPUTER CONTROL OF STEPPER MOTOR USING REDUCED NUMBER OF PARTS

[75] Inventor: Edward Goldberg, Wayland, Mass.

[73] Assignee: NEC Electronics Inc., Mountain View, Calif.

[21] Appl. No.: 566,804

[22] Filed: Aug. 10, 1990

Related U.S. Application Data

[60] Continuation of Ser. No. 377,518, Jul. 10, 1989, abandoned, Division of Ser. No. 173,960, Mar. 28, 1988, Pat. No. 4,847,544.

[51] Int. Cl.⁵ .............................................. H02P 8/00
[52] U.S. Cl. .................................... 318/696; 318/685
[58] Field of Search ............................. 318/696, 685

[56] References Cited

U.S. PATENT DOCUMENTS

| | | | |
|---|---|---|---|
| 4,336,484 | 2/1984 | Karadsheh et al. | 363/124 |
| 4,433,370 | 6/1982 | Marinko | 318/696 |
| 4,471,283 | 9/1984 | Prenley | 318/685 X |
| 4,520,302 | 5/1985 | Hill et al. | 318/696 |
| 4,607,196 | 8/1986 | Abrahams et al. | 318/51 |

OTHER PUBLICATIONS

Electronic Design, Apr. 1987, Edition, pp. 81–84, "One Chip Computer Shrinks Size and Part Count of Stepping-Motor Controller".

Hansen Manufacturing Company, May 1983, Application Note Entitled "Application and Evaluation of Sprague UNC-4202A and UNC-4203A Stepper Motor Transistor/Drivers and IMC Hansen Stepper Motors".

Rifa Data Sheet, Apr. 1986, entitled "High Peformance Stepper Motor Driver" (PBL 3770).

Hansen Manufacturing Company Application Note, Mar. 1984, entitled "Application and Evaluation of RIFA PBL 3717 and Unitrode UC 3717 Stepper Motor Drive Circuit and IMC/Hansen Stepper Motors".

Primary Examiner—William M. Shoop, Jr.
Assistant Examiner—Saul M. Bergmann
Attorney, Agent, or Firm—Skjerven, Morrill, MacPherson, Franklin & Friel

[57] ABSTRACT

A stepper motor control circuit having a reduced number of discrete components is provided by using an on-chip analog to digital converter of a single chip microcomputer to control the waveforms of chopped winding currents. Four power MOSFET's, four diodes and two sense resistors can be added to the circuitry of a board populated by the single chip microcomputer to implement a full step motor controller. The addition of a holding current circuit frees the computer for servicing other tasks when the motor is idle.

14 Claims, 8 Drawing Sheets

SCHEMATIC OF μPD78C11 CONTROLLING A STEPPER MOTOR

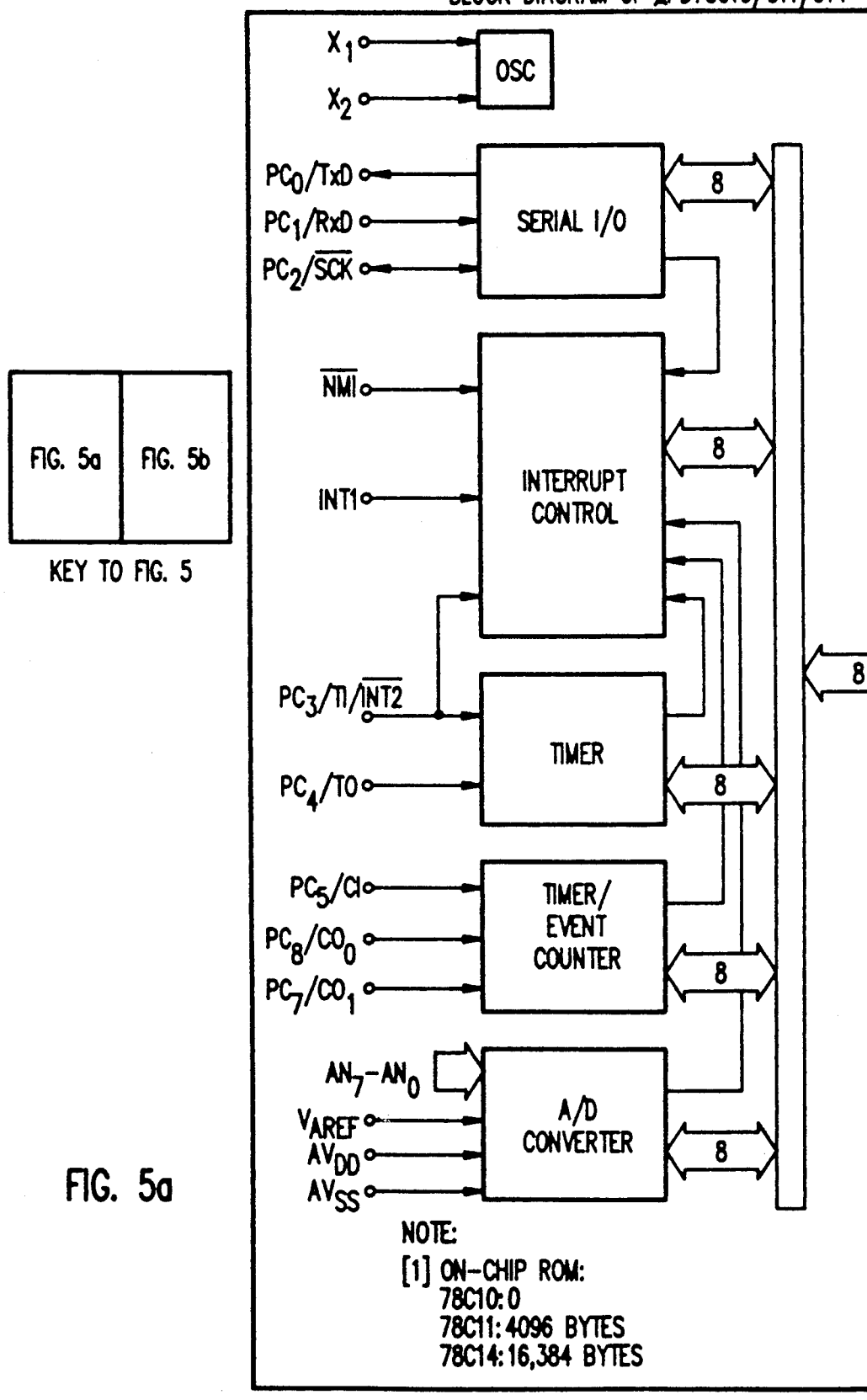

VELOCITY APPROXIMATION PROFILE

FLOWCHART OF MOTOR CONTROL FIRMWARE

MICROCOMPUTER CONTROL OF STEPPER MOTOR USING REDUCED NUMBER OF PARTS

This application is a continuation of application Ser. No. 07/377,518, filed July 10, 1989, now abandoned, which is a divisional of application Ser. No. 07/173,960 filed Mar. 28, 1988, now U.S. Pat. No. 4,847,544 issued July 11, 1989.

BACKGROUND OF THE INVENTION

1. Field of the Invention

The present invention relates to the control of stepper motors and more specifically to a method for reducing the number of components required to control a stepper motor.

1. Description of the Prior Art

Stepper motors are well suited for use with digital control circuitry. In previous years, the control circuitry for driving a stepper motor required a fully populated board of analog, MSI and SSI integrated circuits. Needless to say, the manufacturing cost of such controller boards was quite high and they consumed significant amounts of space.

Dedicated controller chips have recently been introduced to replace some features found on the earlier full board controllers. One such controller chip, designated the PBL 3770, is described in an application note of the RIFA Integrated Circuits Company, dated Apr. 1986. FIG. 1 is a schematic of a stepper motor controller 5 as shown in the RIFA application note. The illustrated circuit 5 has the disadvantage of requiring two separate controller chips, 6 and 7; one for each winding of the stepper motor 8. A plurality of control signals (I0A, I1A, I0B, I1B, Phase A, Phase B) need to be continuously supplied from some external command device(s) (not shown) for proper motor operation. The PBL 3770 is designed to be compatible with LS-TTL logic and is accordingly implemented using bipolar transistors. Bipolar designs consumes significant power in comparison to control circuitry based on CMOS technology. Bipolar designs are also more susceptible to noise problems than are CMOS based control circuits. A large number of external components including a plurality of discrete capacitors 9, diodes 10 and resistors 11 are required for each of the stepper controller chips, 6 and 7, to complete the motor controller circuit 5. These additional components 9, 10 and 11, together with the command signal generating device(s) (not shown), add to the cost and complexity of a stepper motor control system.

Unitrode provides a single chip, designated the PIC-930, which is substantially the equivalent of two RIFA PBL3717 chips in one package (the PBL3717 is an earlier version of the PBL3770). The Unitrode chip reduces the component count of a controller circuit some what but it does not overcome the problem of requiring external command devices. The component count of a complete controller system is therefore still relatively high and circuit complexity is not substantially reduced. The cost, complexity, and multiple command requirements of designs using dedicated control IC's such as the PBL3770 and PIC930 represent an inconvenience to users. This inconvenience tends to detract from the general acceptance of stepper motors in electromechanical applications for which they are otherwise well suited.

SUMMARY OF THE INVENTION

It is a general object of the present invention to overcome the shortcomings of the above-described art and to provide a convenient method for realizing a stepper motor controller. One objective of the present invention is to provide a stepper motor control circuit having a reduced number of discrete components. A second objective of the present invention is to provide a controller circuit which is relatively immune to noise. Yet another objective of the present invention is to provide a controller circuit which can be shared among a plurality of control tasks when the stepper motor is not actively rotating.

The above objectives are realized by using a single chip microcomputer, preferably fabricated with complementary metal-oxide-semiconductor (CMOS) technology, which has an analog-to-digital converter (ADC) integrally provided thereon. The analog-to-digital converter detects the magnitude of winding current passing through a current sensor that is connected to at least one winding of a stepper motor having a plurality of substantially identical windings. Because of circuit symmetry, it can be assumed that the current waveform of one winding is representative of the current waveforms in other windings of the motor and it is not necessary to sense the current magnitude of each winding separately. A current having a chopped waveform is generated in each winding. When an adjustment is made to the chopped current waveform of one winding, the same type of general adjustment is made to the current waveform of a second winding. By controlling the periods of respective rising and falling portions of the chopped waveform, it is possible to establish a desired root mean square value and also a desired peak value for the current magnitude in each winding.

The microcomputer is programmed to poll its internal ADC circuit and determine whether samples of winding current magnitude, taken from one or more of the motor windings, are confined within a predetermined range of values. The upper limit of the range defines the maximum magnitude of current to be allowed in any of the motor windings while the lower limit of the range helps to define the root mean square value of the chopped current passing through each winding. Adjustments are made to the periods of the rising and falling portions of the chopped current waveforms if the polled current magnitudes include one or more sampled values outside the predetermined range. Program controlled outputs of the microcomputer actuate a plurality of winding switches in accordance with instructions provided by a program stored in a memory of the microcomputer. The switches are repeatedly opened and closed to create the chopped current waveform. By changing the opening and closing times of the winding switches, the microcomputer can alter the peak and valley levels of the chopped waveform and thereby adjust either the root-mean-square (or average) magnitude of current flowing through the windings of the stepper motor to equal a desired level. If the sensed winding current samples exceed a predetermined maximum level, the switches are opened and the winding current of each winding is allowed to decay to a lower level by circulating through a degenerative winding loop.

A relatively high voltage, above the motor's rated voltage, is applied across the motor windings while the motor is actively rotating in order to build up the magnetic field of each winding quickly. When the motor is not turning, a lower voltage is preferably applied to one or more of the windings by means of a microcomputer actuated latch to establish a holding current for holding the stepper motor at a desired position. During this hold mode, the microcomputer is freed from the task of having to poll its ADC (to assure that the winding current is below the predetermined maximum) and the microcomputer thus becomes available for controlling other tasks.

BRIEF DESCRIPTION OF THE DRAWINGS

The invention will be described in more detail with reference to the accompanying drawings in which:

FIGS. 5a and 5b are block diagrams of the microcomputer shown in FIG. 4;

DETAILED DESCRIPTION OF THE INVENTION

The following is a detailed description of the best modes presently contemplated for carrying out the invention. The description is intended to be merely illustrative of the invention and is not to be taken in a limiting sense. The scope of the claimed invention is best determined by reference to the language of the accompanying claims.

Figure 1:
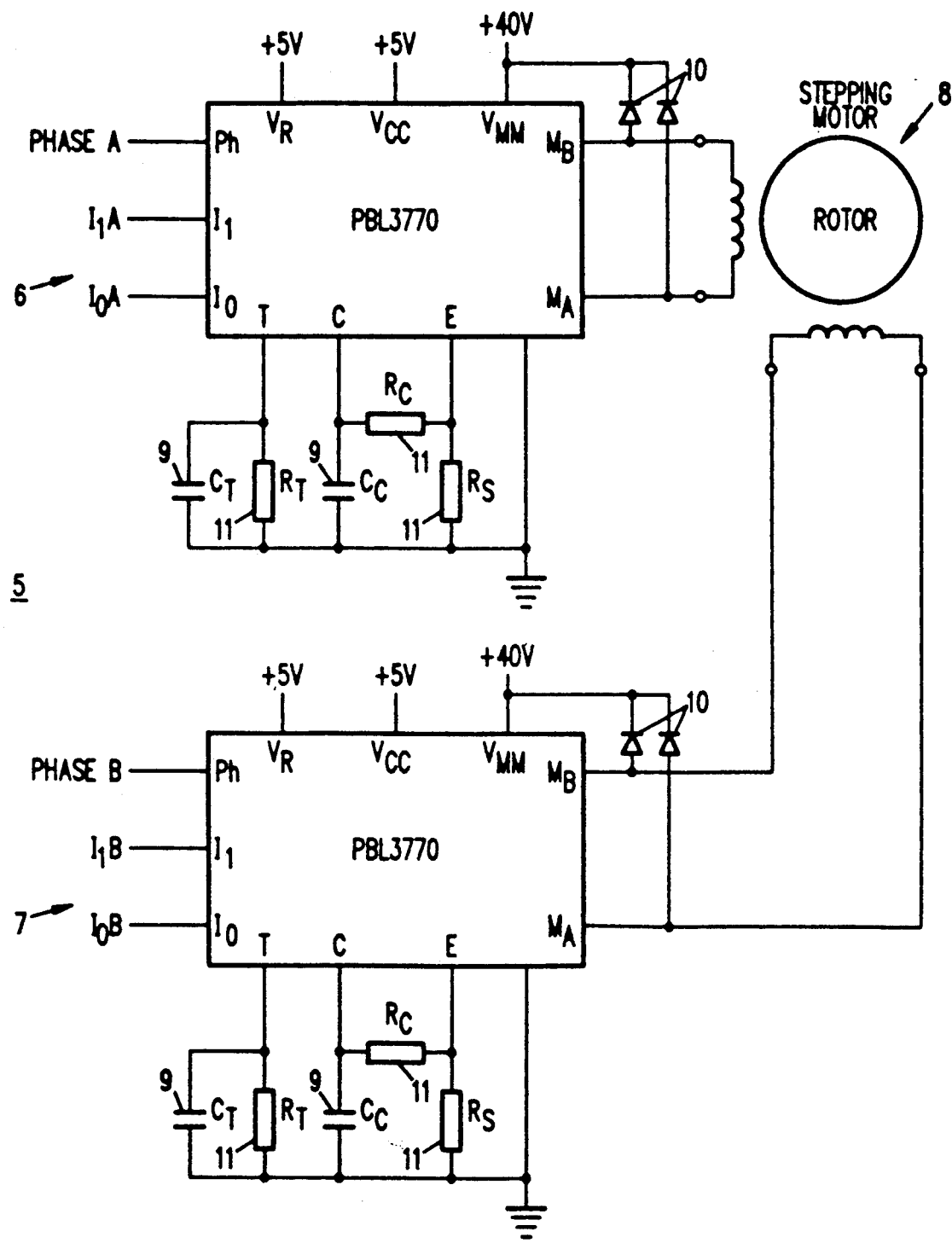
FIG. 1 is a schematic diagram of a previously known stepper motor controller circuit.
Figure 2:
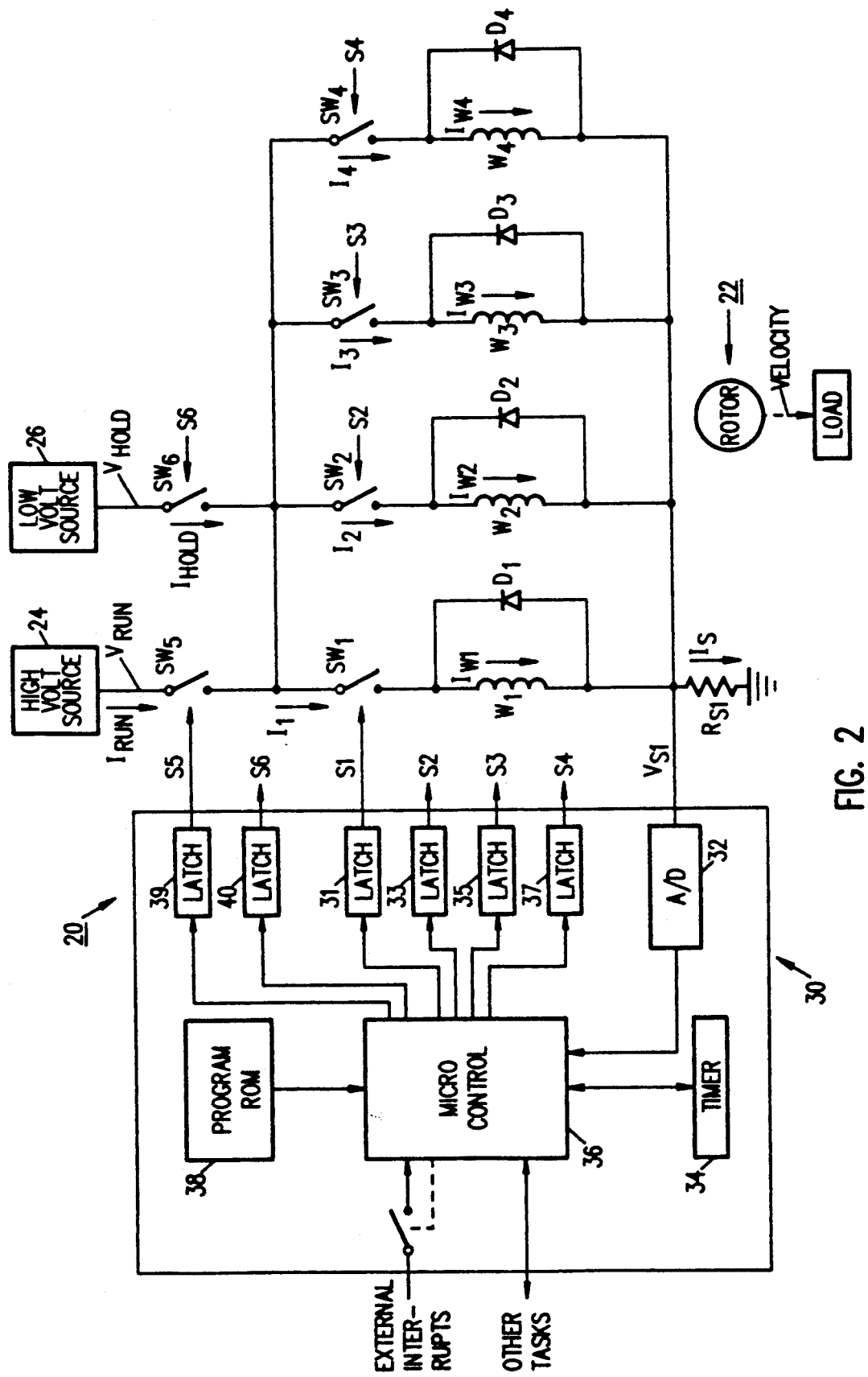
FIG. 2 is a schematic diagram of a first embodiment of the present invention.

FIG. 2 is a block diagram of a first stepper motor controller 20 according to the present invention. The controller 20 is connected to a stepper motor 22 comprising a plurality of winding, $W_1$, $W_2$, $W_3$ and $W_4$, through which respective winding currents $I_{W1}$, $I_{W2}$, $I_{W3}$ and $I_{W4}$ can flow. The magnitude of each winding current, $I_{W1}$-$I_{W4}$, may be increased by closing a corresponding one of four controllable winding switches, $SW_1$-$SW_4$, coupled to respective windings $W_1$-$W_4$. When they are closed, the winding switches, $Sw_1$ through $SW_4$, permit respective field-building currents $I_1$-$I_4$ to flow from a high voltage power source 24 into the windings $W_1$-$W_4$ to thereby increase the magnitude of winding currents $I_{W1}$-$I_{W4}$ and consequently build up the magnetic fields of their corresponding windings. When a particular one, $SW_x$, of the winding switches, $SW_1$-$SW_4$, is opened the winding current $I_{Wx}$ of its respective winding $W_x$ decays by circulating through a degenerative loop formed by a corresponding one, $D_x$, of four diodes, $D_1$-$D_4$, connected in parallel to respective motor winding $W_1$-$W_4$.

Winding currents $I_{W1}$-$I_{W4}$ are sequentially turned on and off in windings $W_1$-$W_4$ in order to turn the rotor of the stepper motor during a run mode. Half step or full step motor control can be obtained with suitable actuation of the winding switches in various combinations (i.e. two of the four windings are always turned on simultaneously in full step control). The power output and/or speed of the rotor is determined, in part, by the average magnitude (or RMS value) of current flowing through each of the motor windings $W_1$-$W_4$. A "current-chopping" technique is used to obtain a current waveform having a desired RMS or average magnitude. A run mode switch $SW_5$, disposed between the high voltage power source 24 and the windings $W_1$-$W_4$, is closed during the run mode to apply a relatively high run voltage $V_{run}$ to the winding $W_1$-$W_4$. The run voltage $V_{run}$ is preferably selected to exceed the manfacturer's rated voltage $V_{rated}$ for the windings $W_1$-$W_4$ so that the winding current $I_{Wx}$ in each inductive winding, $W_x$, can follow an accelerated field building trajectory (FIG. 3) and build up at a rate substantially greater than that possible with just the rated voltage $V_{rated}$ of the winding $W_x$ applied across that winding. There is, of course, a rated current $I_{rated}$ associated with the rated voltage $V_{rated}$ of each of the windings. The windings can burnout if the rated winding current $I_{rated}$ is exceed for long continuous periods of time. If on the other hand, $I_{rated}$ is exceeded only briefly, the likelihood of winding burnout is relatively small.

Figure 3:
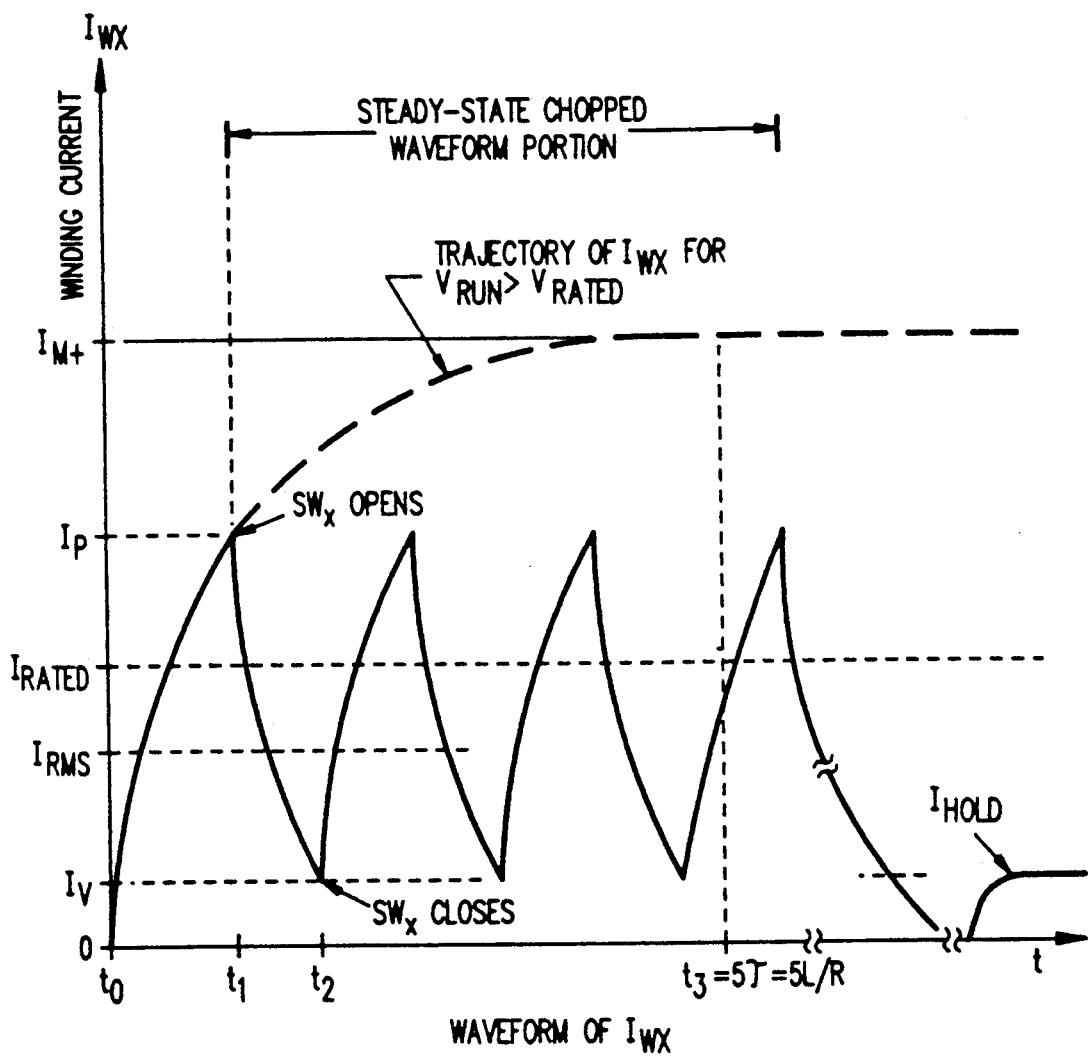
FIG. 3 is a graph of winding current versus time.

Referring to FIG. 3, when the corresponding winding switch $SW_x$ of a winding Wx is closed at an initial time $t_0$, the winding current $I_{Wx}$ increases rapidly along an inductive circuit trajectory towards an above-maximum value $I_{M+}$ and thereby causes the magnetic field of the winding $W_x$ to build up quickly despite a limiting time constant associated with the resistance and inductance (RL) of the winding circuit. The time constant is proportional to the inductance of the circuit, L, divided by the resistance of the circuit, R. Once the winding current $I_{Wx}$ reaches a desired peak value $I_p$, which is less than the above-maximum value $I_{M+}$, switch $SW_x$ is opened (time $t_1$) and the winding current $I_{Wx}$ dissipates by circulating through a degenerative loop formed its respective diode $D_x$. This dissipation defines the falling portion of the chopped current waveform as shown in FIG. 3 between times $t_1$ and $t_2$.

It should be noted that the peak value $I_P$ of the chopped current can be much greater than the rated current $I_{rated}$ of the winding. As long as the winding current $I_{Wx}$ is held above the rated current level $I_{rated}$ for only a brief time, winding burnout does not become a problem. The winding current decays to a value below the rated value $I_{rated}$ for the remainder of each cycle and this helps to reduce the total amount of heat generated in each winding. Winding switch $SW_x$ is repeatedly opened and closed to obtain the steady-state chopped portion of the current waveform illustrated in FIG. 3 (i.e. $t_1$ through $t_3$). The root-mean-square (RMS) value, $I_{RMS}$, of the winding current $I_{Wx}$ is set by timing the openings and closings of switch $SW_x$ to correspond to desired peak and valley values, $I_p$ and $I_v$, occurring along the field-build-up and field-collapse trajectories of the winding current $I_{Wx}$. These trajectories are established by the value of the applied run mode voltage $V_{run}$ and the time constant L/R of the winding circuit. It has been found that switch open and switch close periods of less than one millisecond and preferably on the order of about fifty to one hundred microseconds each work well with commercially available stepper motors such as for example a size 23 IMC/Hanson stepper.

In order to accurately control the root-mean-square value $I_{RMS}$ of the winding current, the illustrated stepper controller 20 uses a current sensing means such as a resistor, $R_{S1}$, coupled to windings $W_1$-$W_4$ of the motor 22 and further coupled to an on-board analog-to-digital converter (ADC) 32 of a general purpose, single chip microcomputer 30. The microcomputer 30 is preferably fabricated with CMOS technology and designed to include an interval timer 34 for precisely setting the turn on and turn off times of winding switches $SW_1$-$SW_4$. An analog voltage $V_{s1}$ developed across the sensing means $R_{S1}$ when a sense current $I_s$ flows through is continuously converted into digital form on a sampled basis by the A/D convertor 32 of the microcomputer and sample values output by the converter are repeatedly tested (polled) by a microcontrol unit 36 of the microcomputer 30 during the run mode to determine whether one of the switched currents $I_1$ through $I_4$ includes a waveform point that exceeds a predetermined threshold value $I_P$. The polling time of the microcomputer should be set sufficiently short relative to the L/R time constant of the motor circuit to assure that the winding current sensed by the sensing means, resistor $R_{S1}$, does not have a chance to climb beyond the threshold value $I_p$ without detection. The microcomputer 30 is preferably programmed to block off external interrupts at this time so that such interrupts will not interfere with its polling period. Winding switches $SW_1$-$SW_4$ should all be opened whenever there is a danger that the microcomputer 30 cannot assure that the winding current in any one of the windings $W_1$-$W_4$ will not exceed the peak value $I_p$ and further that the current in any one of the windings does not exceed the rated value $I_{rated}$ for more than a short time.

Figure 4:
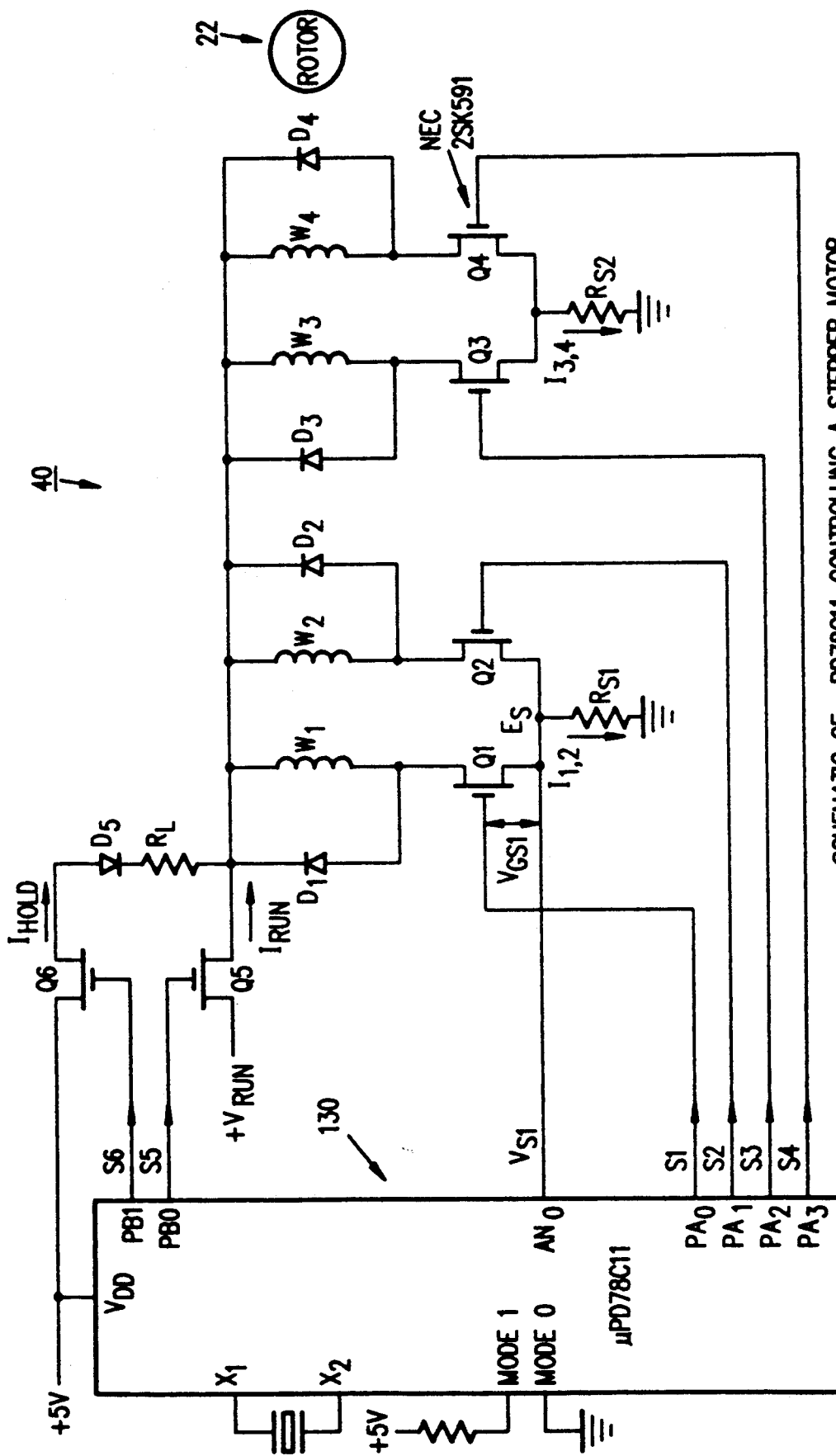
FIG. 4 is a schematic of a second embodiment of the present invention.

Switches $SW_1$-$SW_4$ are preferably opened and closed to chop their respective currents in accordance with identical, although time staggered, switching intervals so that the respective individual peak currents $I_{P1}$-$I_{P4}$ of the windings $W_1$-$W_4$ will be substantially identical. When such identical switch timing is used, it is not necessary to determine which of currents $I_1$ through $I_4$ causes the sense voltage $V_{sl}$ to exceed a predetermined threshold level $V_p$ corresponding to the threshold current $I_p$. An adjustment to the timing of the current chopping openings and closings of all the switches $SW_1$-$SW_4$ is made simultaneously when the sensed voltage $V_{s1}$ is found to include a sample point that exceeds the threshold $V_p$. The use of a single current sensing device, resistor $R_{s1}$, to control a plurality of winding currents $I_{w1}$-$I_{w4}$ is advantageous in that the microcomputer 30 does not have to spend time for converting a plurality of analog voltages (i.e., the voltage $V_{s2}$ of a second sense resistor $R_{s2}$ such as shown in FIG. 4) into digital form and for polling the values of such plural converted signals to determine if they are within a desired magnitude window. It will, of course, be understood that when more than one winding is on at a time (a state which the microcomputer controls by actuating switches $SW_1$-$SW_4$) the microcomputer needs to take in consideration that the sense current $I_s$ through sensing device $R_{s1}$ is double, triple or some other multiple of current in each of the active windings. It should be understood as well that the power consumption of sensor $R_{s1}$ increases as the square of the current $I_s$ when such doubling, tripling and so forth of winding currents passing through resistor $R_{s1}$ occurs and that $R_{s1}$ needs to be designed to handle such power. The use of a dummy sensor configuration such as shown in FIG. 4 helps to reduce the power consumption of the circuit. If desired, each winding can have its own sensor resistor coupled to a separate A/D channel of the microcomputer. Such a configuration can increase the component count of the circuit, however.

A microcomputer with an instruction time of one microsecond or less can be obtained commercially and programmed to poll the ADC output samples at a rate of as little as once every 20 microseconds (assuming a polling routine of 20 instruction having a 1 microsecond average instruction time). Given a winding circuit with an appropriate circuit time constant L/R, the polling routine can be designed to assure that the current $I_{wx}$ of each winding will not climb above the rated value $I_{rated}$ for too long a time and that winding burnout will thus not occur.

One advantage of using a general purpose microcomputer 30 having a large repertoire of functions contained in a single package instead of a dedicated controlled chip (e.g. the RIFA PBL-3770 or Unitrode PIC-930) is that a memory section 38 of such a microcomputer can be programmed to provide a variety of high level control functions, such as for example, ramping the velocity of the motor and/or halting the motor at a desired rotational position, without increasing the component count (number of discrete packages) of the circuit. The velocity ramping function will be described in more detail when the embodiment of FIG. 4 is discussed. Methods for efficiently bringing a stepper motor to a desired rotational (angular) position are known in the art and need not be described in detail here.

When the motor finally reaches a desired static position, the current required for maintaining such a position, $I_{hold}$, will typically be much smaller than the current needed for rotation. Usually, the holding current $I_{hold}$ does not have to change as rapidly as does the run current of the motor. Rapid field-build-up is usually desired only during dynamic rotation. As such, an above rated winding voltage is not required during the hold mode to build up the winding currents rapidly.

The controller circuit 20 of the present invention includes a hold mode circuit comprising a low voltage power source 26 for supplying a holding voltage $V_{hold}$ less than the run voltage $V_{run}$ and a hold mode switch $SW_6$ connected to apply the holding voltage $V_{hold}$ to the motor windings, $W_1$ through $W_4$. The hold mode circuit is preferably designed to limit the winding currents $I_{w1}$-$I_{w4}$ to well below their rated value $I_{rated}$ during the hold mode so that the danger of winding burnout is eliminated.

The microcomputer 30 preferably includes a plurality of latches (31, 33, 35, 37, 39 and 40) for outputting switch control signals S1 through S6 to respective switches $SW_1$ through $SW_6$. During a hold mode, latch 40 is actuated to close switch $SW_6$, latch 39 is actuated to open switch $SW_5$ and suitable ones of latches 31, 33, 35 and 37 are actuated to close or open winding switches $SW_1$ through $SW_4$ for maintaining a desired holding position. With the latches thus actuated, the stepper motor 22 is safely held in position and the microcomputer is free to make its other resources (computational capabilities) available for other system tasks.

Figure 5B:
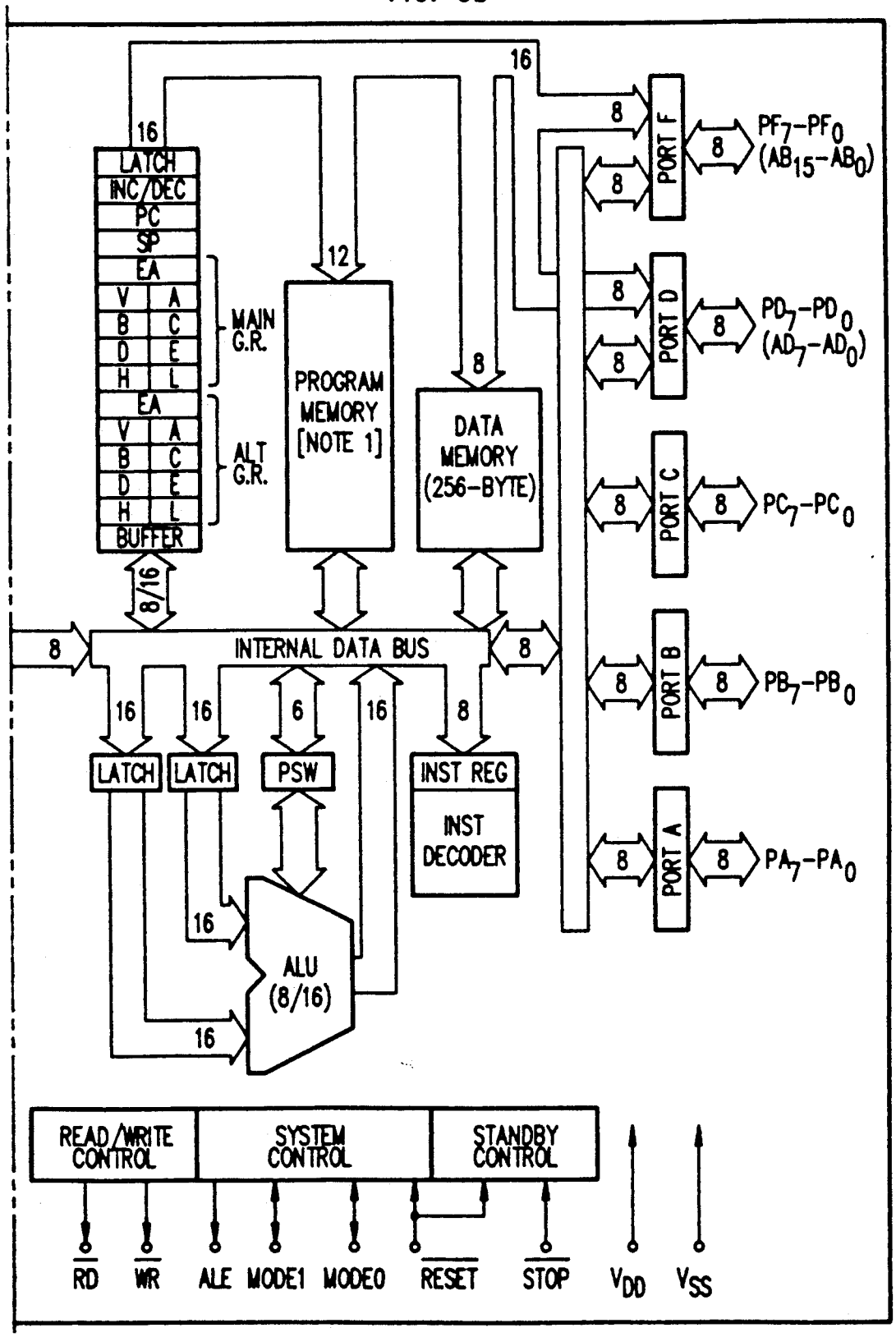

The signal processing capabilities of full feature microcomputers in general, and the NEC μPD78C11 in particular will now be discussed with reference to FIGS. 4, 5 and 6.

Microcomputers have evolved into very powerful devices since their introduction approximately 10 years ago. The instruction sets have become very sophisticated and the internal architectures can commonly process 16 bits or more at a time. In addition, the new generation of microcomputers now contain many on-chip capabilities, such as independent timing and A/D conversion, and they are fabricated in CMOS. The net result of this progress is that more functionality can be achieved with a fewer number of discrete components.

The NEC μPD78C11 is one type of CMOS microcomputer which has such features. As a result, it can be used in a wide variety of applications. The control of stepping motors is an ideal application because motors generate lots of noise and CMOS has high inherent noise immunity. By using the newest generation of power MOSFETS in combination with a 78C11 microcomputer (FIG. 5) a stepping motor can be controlled with one microcomputer chip and just ten external components in addition to other components normally used in support of the microcomputer. Since most printed circuit boards include a microcomputer anyway, the increase in component count can be as little as ten for adding a stepper motor control capability. One of the unique on-chip capabilities of the 78C11 that make this possible is an 8-channel, 8-bit A/D converter having a convert time of approximately 12 microseconds per channel (15 MHz operation). Motor control can be accomplished using the on-chip A/D converter together with an on-chip timer/event counter, one of two on-chip interval timers, 4k of ROM space and the 10 external components.

FIG. 4 shows how the 78C11 may be used for motor control. The power space and number of components external to the 78C11 is significantly reduced in comparison to prior art controllers. This configuration 40 (FIG. 4) comprises 4 MOSFETS (Q1-Q4), 4 protection diodes (D1-D4) and 2 sense resistors, $R_{S1}$ and $R_{S2}$ Windings $W_1$-$W_4$ are four motor windings of a stepper motor 122 and they are driven by currents switched through MOSFETS Q1-Q4. The four MOSFET's Q1-Q4 are controlled by latched outputs PA0-PA3 of the 78C11. (FIG. 5 is a block diagram of the 78C11 microcomputer.) MOSFETs Q5 and Q6, diode D5 and resister $R_L$ are not required to control the motor 122 and will be discussed later. For the present, assume Q5 is on (conductive) and Q6 is off (nonconductive). Because outputs PA0-PA3 each drive a MOSFET gate requiring virtually no current, the outputs can charge the gates of MOSFETS Q1-Q4 to approximately 4.5 volts or higher. This capability allows the power MOSFETs to be directly driven by the 78C11 without use of level shifting components. The newer power MOSFETs can operate as high current switches (for switching 1 ampre or more) with a gate to source voltage Vgs of as little as approximately 3-4 volts. One such MOSFET is the NEC 2SK591 which can supply 15 amps at Vgs=3.0 volts. This use of new generation MOSFETs immediately saves four discrete transistors which were used in older designs as level shifters.

In the design 40 shown in FIG. 4, the motor stepping rate and the motor winding currents $I_{Wx}$ are controlled by the 78C11 microcomputer (denoted by reference number 130). The control of the motor stepping rate (measured in motor steps/second) is accomplishing using the timer/event counter in the 78C11 (FIG. 5). The firmware in the 78C11 may be written so that the motor can be controlled to accelerate to a given velocity, slew at that velocity for a programmable distance and then decelerate to a stop at a specific position. This procedure of increasing and decreasing motor velocity, known as "ramping," is desirable in many stepping motor applications because the inertial load on the motor shaft is too high for the motor to be simply driven immediately to its maximum speed from a standing start. Also, the motor and its load cannot be stopped instantly when running at maximum speed. The typical recommendation of stepping motor manufacturers is to accelerate and decelerate the motor at a constant rate. The 78C11 can be programmed to drive the motor using a stair case type of velocity profile, which approximates the profile of one or more linear ramps as shown in FIG. 6. Virtually any velocity profile can be emulated by the 7811 simply by tailoring a ramp step table in memory. Multiple profiles can be easily created. When the 78C11 is used with a 15 MHZ crystal, the timer/event counter has a resolution of approximately 0.8 microsecond. This small resolution can be used to generate a large number of ramp steps and the latter can be used to create very accurate velocity profiles. The velocity profile tables can then be combined with motor commands to generate motor motions having very specific profiles and traversing predetermined distances. The associated firmware which couples the motor commands with the velocity profiles can be stored in the 78C11's on-chip ROM along with user defined velocity profiles.

Figure 6:
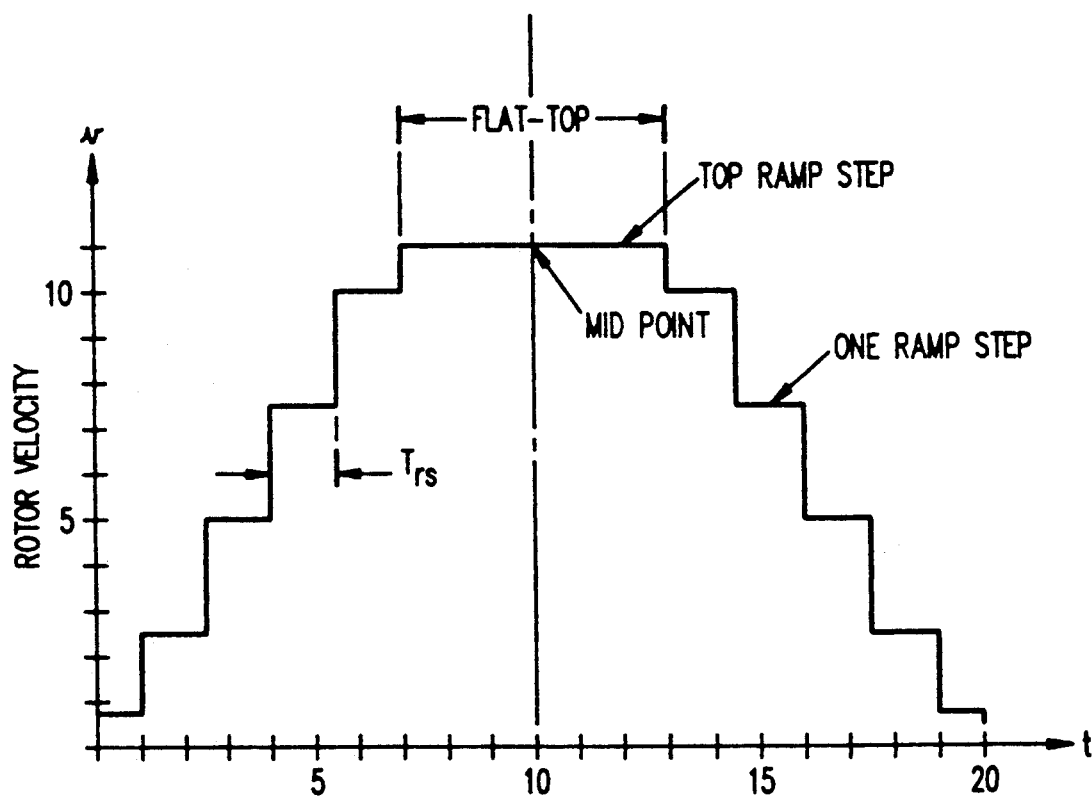
FIG. 6 is a diagram of a stepper motor speed versus time profile.

The velocity profile tables are constructed in accordance with a stair case diagram such as shown in FIG. 6. The number of entries in the table depends upon how closely the velocity approximation profile must emulate a linear ramp and how small the time interval of each step needs to be. Each ramp step shown in FIG. 6 corresponds to a table entry. A table entry may consist for example of a divider number for the timer/event counter and a second number representing the number of motor steps that the motor will take during a certain time interval to achieve a desired rate. First the velocity scale in FIG. 6 must be converted to motor shaft revolutions/sec. The time scale in FIG. 6 shows the time for each ramp step Trs. Each table entry can then be calculated using the following two equations when the motor velocity is expressed in revolutions/second:

$$Drs = \frac{360 \times Vm \times Trs}{Dm} \quad \frac{\text{Motor Steps}}{\text{Ramp Step}}$$

$$Cn = \frac{Dm \times fc}{360 \times Vm} \quad \frac{\text{counts}}{MS}$$

where:
Drs=distance, in motor steps.
Vm=motor speed, in revolutions/second.
Trs=time of a ramp step, in seconds.
Dm=motor resolution, in degrees/motor step.
Cn=velocity counter divider number.
fc=frequency of timer/event counter clock.

If the velocity is expressed in motor steps/sec (Vss), the two equations are simplified to:

$$Drs = Vss \times Trs \frac{\text{Motor Steps}}{\text{Ramp Step}}$$

$$Cn = \frac{fc}{Vss} \quad \frac{\text{counts}}{MS}$$

Using the equations for Drs and Cn, a table may be built in the computer's memory. The format of the table using assembly language notation could be as follows:

```
VEL1:  DW   nnnnH   ;NUMBER OF RAMP STEPS IN THIS
                    RAMP.
       DW   ssssH   ;TOTAL NUMBER OF MOTOR
                    STEPS IN THIS RAMP.
       DW   Cn1     ;RAMP STEP 1 DIVIDER.
```

-continued

| | | |
|---|---|---|
| DW | Drs1 | ;RAMP STEP 1 LENGTH. |
| DW | Cn2 | ;RAMP STEP 2 DIVIDER. |
| DW | Drs2 | ;RAMP STEP 2 LENGTH. |
| . | . | . |
| . | . | . |
| . | . | . |
| DW | Cnn | ;LAST RAMP STEP DIVIDER. |
| DW | Drsn | ;LAST RAMP STEP LENGTH. |

High stepping motor rates can be achieved if desired, by using a motor winding voltage $V_{run}$ which exceeds the rated motor winding voltage $V_{rated}$ as shown in FIG. 3. When high rates are not required, $V_{run}$ is preferably set to $V_{rated}$ or less. The RMS value of the winding current should be held below the maximum rated operating current of the motor windings $I_{rated}$ over the long run. The maximum stepping rate of the motor is dependent upon how fast the motor's electromagnetic field can be generated. The time to generate the electromagnetic field is dependent upon how fast the motor winding current can be built up. As can be seen from FIG. 3, by raising the motor voltage $V_{run}$ above the rated voltage $V_{rated}$, the time to generate a desired current level can be much less than 5T, where T is the time constant of the circuit (T=L/R.) Hence, using a higher voltage on the motor winding decreases the time to reach $I_{rated}$ thereby decreasing the time to build up the magnetic field. This allows higher stepping motor rates. The problem with this technique is (as was explained earlier) that if the motor current $I_{Wx}$ is not controlled, the motor windings may burn out.

The current $I_{Wx}$ can be chopped using the A/D converter, some firmware and outputs PA0-PA3 of the 78C11. In the application shown in FIG. 4, the motor will be driven using full motor steps. This means that only one winding in each winding pair of pairs $W_1$-$W_2$ and $W_3$-$W_4$ will be on at a time and that two of the four windings will be on for each step of the motor. Hence, the current $I_S$ being sensed in resistor $R_{s1}$ is the current in only one or the other winding of winding pair $W_1$-$W_2$. The sensed voltage $V_{S1}$ is input to the $AN_0$ channel of the A/D converter. A firmware routine polls input $AN_0$. If the digitized value of $VS_1$ exceeds a pre-programmed threshold value 'IMOT', two MOSFETS which were initially turned on (one in winding pair $W_1$-$W_2$ and the other in pair $W_3$-$W_4$) to achieve a desired stepping state, are turned off. The winding current of these turned off MOSFETs then decays by circulating through one of degenerative diodes $D_1$ and $D_2$ in winding pair $W_1$-$W_2$ and $D_3$-$D_4$ in winding pair $W_3$-$W_4$. It should be noted that resistor $R_{S2}$ acts as a dummy sensing device since the computer is not connected to sense its voltage in the illustrated configuration. $R_{S2}$ is matched to $R_{S1}$ so that the circuits of winding pair $W_1$-$W_2$ and winding pair $W_3$-$W_4$ are substantially identical. $R_{S2}$ could be connected to the $AN_1$ channel of the multiplexed A/D of the 78C11 if desired so that the continuity of windings $W_3$-$W_4$ could be tested during system initialization.

The input $An_0$ continues to be polled by the firmware and when its digitized value is found to be less than or equal to the threshold value, the MOSFETS which were previously turned off are again turned on. A similar firmware test is used for establishing the level of valleys in the winding current magnitude, Iv. In this manner the stepping motor current is chopped (increased and decreased over time) and controlled to operate at a predetermined average or RMS value.

FIG. 3 shows the waveform of $I_{Wx}$ when it is chopped. Although the current reaches a value $I_p$ which is greater than $I_{rated}$, the motor winding will not burn out if the RMS value ($I_{rms}$) is less than $I_{rated}$. The value "IMOT" can be chosen so that $I_{rms} < I_{rated}$.

Another consideration in FIG. 4 is the size of the sense resistor $R_{S1}$ and its twin dummy resistor $R_{S2}$. The power rating of each resistor is calculated by the equation:

$$P = (I_{rms})^2 \times Rs$$

If $I_{rms} = 1$ amp, then an 1 ohm 2 watt resistor may be used which will not require much room or generate much heat. If, however, $I_{rms} = 5$ amps, then an 1 ohm resistor would dissipate 25 watts and a 40 watt resistor would be required for obtaining a safe operating margin (160%). This of course is not desirable since such a resistor would consume a lot of power, require a lot of space and add an expensive component to the design as well. A better solution to the problem would be to use an 0.1 ohm resistor. Here the power consumed would be 2.5 watts and a five watt resistor package could be used. The threshold levels of the microcomputer for turning switching transistors $Q_1$-$Q_4$ on and off are, of course, adjusted to correspond to the lower voltages developed across the 0.1 ohm resistor. It should be noted that by dividing the winding currents up among sense resistor $R_{S1}$ and dummy sense resistor $R_{S2}$, current through each is halved and the power rating of each is cut fourfold.

MULTITASKING

If the 78C11 must be constantly polling its A/D converter, its time is completely consumed and it has no time to perform other functions. However, with the addition of MOSFETS Q5 and Q6, one diode D5, and one current limiting resistor $R_L$ (see FIG. 4), the 78C11 could be used in a multitasking environment.

Here, when the motor is idle, Q6 would be on and Q5 would be off. The motor holding current could be supplied by the 78C11's +5 volt power supply. Port B bits PB0 and PB1 could latch Q5 and Q6 to be respectively off and on. Diode D5 allows Q6 to be switched on before Q5 is switched off. Current limiting resistor $R_L$ can be used to keep the motor holding current at or below $I_{rated}$. With the motor current limited by $R_L$ and the lower holding voltage ($V_{HOLD} = 5v$), the 78C11 can safely stop polling the A/D converter and become available to perform many other user definable functions. When the 78C11 receives a command to drive the motor, the A/D polling would start, Q5 would be turned on, Q6 would be turned off, and high power motor control would begin again. When a firmware flag indicates that the motor has reached its final position, Q6 is turned on, Q5 is turned off, A/D polling ceases and the 78C11 is once more free to take on new tasks.

MOTOR CONTROL FIRMWARE

Figure 7:
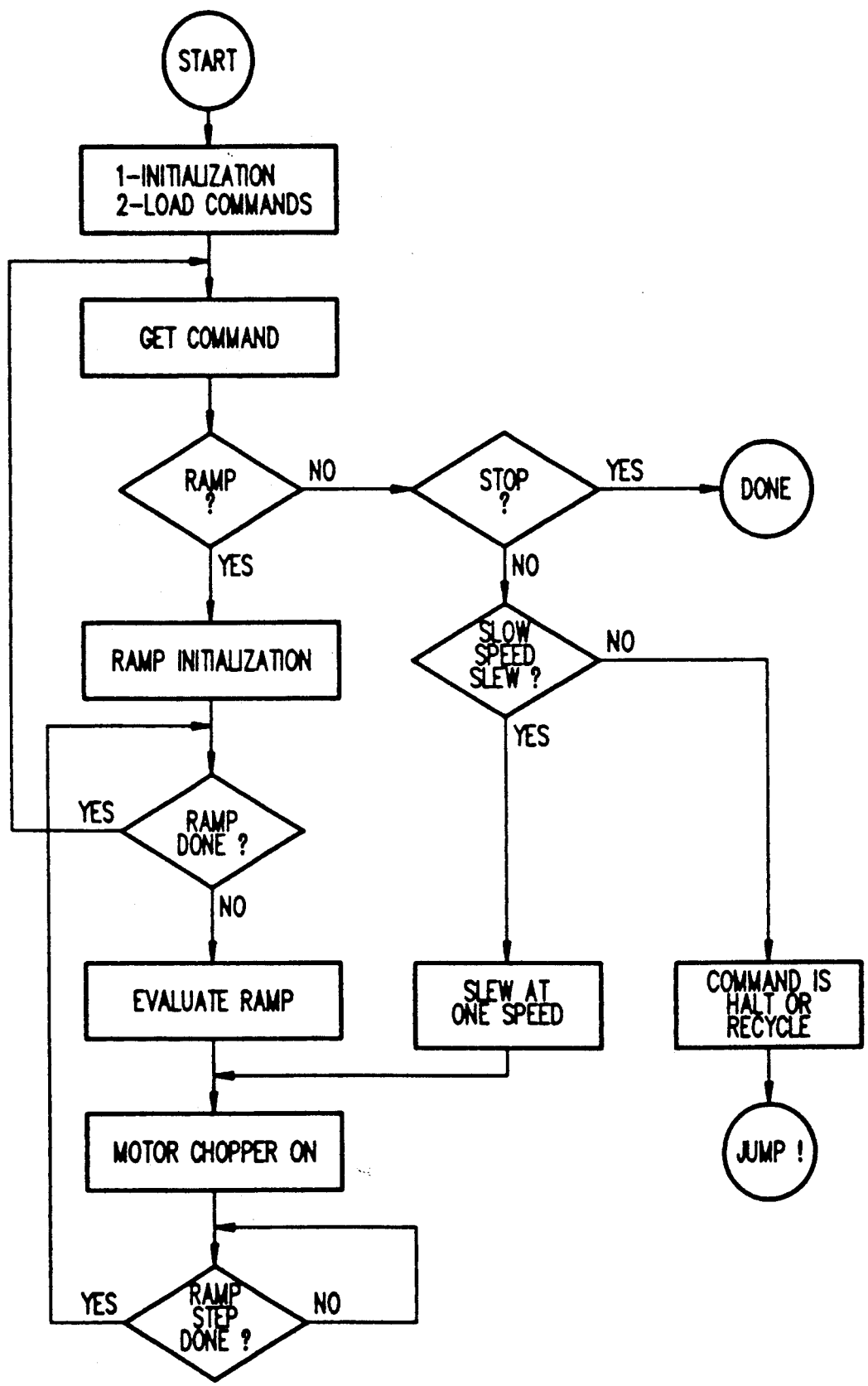
FIG. 7 is a flow chart of a method for realizing the speed/time profile of FIG. 6.

The motor control firmware fetches commands which are in a motor command buffer and uses them to control the motor The commands are put into the buffer by a main program and a jump is made to the control firmware. The firmware fetches and processes the first command, switches the motor from the holding to the active mode, and executes the command. When the command has been executed, the next motor command is fetched and executed. The sequence of fetching and executing commands continues until a STOP command is detected. When this happens, the motor is put in the hold mode and the CPU jumps from the motor control firmware to the main program where other tasks are performed. FIG. 7 shows a flowchart of a method for executing plural commands.

Each motor command can consist of two words. Nibble N0, bits 3 and 2, of the first word may specify the motor direction as follows:
- 00=Stop motor rotation
- 01=CCW rotation
- 10=Not used
- 11=CW rotation Bits 1 and 0 of nibble N0 can be used for the two MSB's of the total command length. Nibble N1 of the first word (bits 4–7) can specify the motor functions as follows:

| | |
|---|---|
| 0H | Slew at slow speed 1 (no ramp) |
| 1H | Slew at slow speed 2 (no ramp) |
| 2H | Velocity profile 1 |
| 3H | Velocity profile 2 |
| 4H | Velocity profile 3 |
| 5H | Halt and wait for new commands |
| 6H | Stop. End of motor commands |
| 7H | Recycle - Repeat previous commands (used for debug) |
| 8H - FH | Not used |

Word two of the command can contain the low 16-bits of the total number of motor steps to be traveled for this command. If the 18-bit command length is not adequate, the high order 8-bits of word one can be used for additional distance specification.

The ramp firmware fetches and executes the ramp steps in the ramp tables of the computer memory. The firmware gets the first ramp step, and drives the motor the distance of the step at the rate specified for that step. When the step is completed, the next ramp step is taken from the table and the process is repeated until the top step of the ramp is reached. At the top, the motor is driven the length of the ramp flat-top (see FIG. 6) at the ramp step rate specified in the table. When the end of the flat-top is reached, the firmware starts ramping down (decelerating) until the bottom of the ramp is reached. When the bottom step is completed, the ramp is finished. The slow speed 1 and 2 commands, which drive the motor at a constant speed, are handled by the firmware as one step ramps. The firmware may be designed so that a motor command can specify a ramp whose length is less than the total length of the ramp in the table. When this occurs, the ramp may never reach the top ramp step. In this situation, the velocity profile looks more like a triangle rather than a trapezoid.

FIG. 7 shows a flowchart of the motor control firmware. The initialization (starting at "START") performs such tasks as clearing the timer/event counter, selecting its clock source and specifying what conditions clear the counter. The V register of the 78C11 is set to point to the base address of the working registers for the motor control routines. The voltage threshold value IMOT is set and all interrupts except the timer/event counter are masked. The motor commands are moved from an input buffer ("MOTCMD") to a working buffer ("DATBUF") by a "LOAD" routine. All motor motion is initiated by a "SETGO" routine.

The firmware fetches the function nibble N1 of the first command using an RLD instruction in a "GETCMD" routine. It decodes the nibble and jumps to the subroutine for that command using TABLE and JB instruction of the 78C11. If the firmware decodes the command to be a ramp ("RAMP1, RAMP2 OR RAMP3"), the velocity profiles are generated using the timer/event counter and the motor state tables. The divider value in the timer/event counter changes with each new ramp step. The firmware initializes and evaluates the ramp before the chopper is turned on. The first initialization step is to set the firmware to ramp step 0 and set the ramp step increment to +1. The routine then gets the ramp length from word 2 of the motor command. The half length of the command is calculated and saved in a working register. The motor direction is then taken from nibble N0 of word 1 and is also saved in a working register The first step in evaluating the ramp and ramp step (routine "RMPSTP") is to turn off all four MOSFETS Q1–Q4. This is done to protect the motor windings from being damaged since the 78C11 cannot simultaneously evaluate the ramp and check the A/D to assure winding current does not climb too high. A check is made to determine if the velocity profile has been completed. If it has, then the firmware will fetch the next command by jumping to "GETCMD." If the profile is not finished, the firmware must check to find out what part of the ramp is being emulated. A check is made to determine if the ramp top has been reached If it has, the top step counter divider Cn is loaded into the timer/event counter and the firmware jumps to a "CALCTOP" routine which calculates the length of the "flat top" (see FIG. 6). Depending upon the distance specified in word 2 of the motor command, the flat-top length may be less than, equal to, or greater than the top step length specified in the ramp table. When the calculation is finished, the firmware will drive the motor that distance at the fastest ramp step velocity in the table using the "SETGO" routine.

If the current step is not the ramp top, a jump is made to a "STEPOK" routine. The corresponding divider Cn is loaded into the counter and a check is made to determine if the motor is being decelerated (ramping down). If it is, the length of the current ramp step is taken from the velocity table and the motor is driven that distance using a ramp down routine ("RAMPDN"). If the motor is being accelerated (ramping up), a check is made by the "CHKTOP" routine to determine if the length of the current ramp step will cause the ramp wave form to be driven to or beyond the ramp profile midpoint. If it does, the firmware will jump to the "CALCTOP" routine, calculate the flat-top distance and cause the motor to be driven the remaining distance at the current ramp step velocity. If the motor is ramping up, and the ramp step distance will not drive the motor beyond or to the ramp step midpoint, then the ramp step distance is subtracted from the remaining ramp half length ("HALFSEG") and this value is saved. This ramp step will then be executed Each time a ramp step is completed, the firmware will return to the ramp step routine ("RMPSTP") and this process will be repeated.

If the command is slow speed 1 or slow speed 2, the "SLOWSP1" or "SLOWSP2" routines simply drive the motor at a constant velocity using nibble N0 to determine the motor direction. The timer/event counter is loaded from the stepping motor velocity tables with one of the divider numbers from the "CONSPD" table. The motor is driven until the motor has traveled the number of motor steps specified by word 2.

A "POLLAD" routine performs the motor chopping function by polling the A/D converter in the select mode. The first step is to disable the interrupts so that the timer/event counter will not cause an interrupt. The A/D is then set to the select mode by executing a MVI ANM,01H instruction. Executing this instruction causes the A/D to be set to the select mode, sample input AN0, and put the converted result in register CR0. A 50 usec delay is preferably used to give the A/D sufficient time to sample and convert the input value. One of the two interval timers may be used to generate the delay. The sampled value is compared to the threshold value "IMOT." If the sampled value is less than or equal to the threshold, the motor MOSFET drivers Q1-Q4 are left on, or, turned on to a currently desired state if they had been off. If the sampled value is greater than "IMOT," the drivers are all turned off. The interrupts are then enabled and the firmware checks to see if the current ramp step is complete. If it is, the firmware jumps to the ramp step routine ("RMPSTP"). If the ramp step is not done, the firmware continues polling the A/D at "POLLAD."

A timer/event counter interrupt routine "INTX" has the task of outputting motor states and counting motor steps. Each time the timer/event counter times out, an interrupt is generated indicating the motor has completed one motor step at the current velocity. The routine gets the next motor state (e.g. the four states of a full stepping sequence) from the motor stepping table ("FSTP") and outputs it to port A. This causes the motor to move one motor step. The firmware continuously cycles though four states in a motor state table (used in full step -motor- operation). To run the motor in the opposite direction, the sequence is the same except the firmware cycles through the motor state table in the reverse direction. The "INTX" routine also decrements a working register "CTSTP," which contains the remaining number of motor steps to be executed for the current ramp step. The value in the register is then tested and if it is zero, the ramp step is complete and register B is loaded with a 00H. Setting B to 00H indicates to the motor chopping routine that the ramp step is completed. This causes a jump to "RMPSTP" where the ramp is again evaluated.

DERIVATION OF RAMP DISTANCE AND VELOCITY DIVIDER EQUATIONS

The derivations of the equations for calculating the ramp step distance (drs) and the timer/event counter velocity divider (Cn) for velocities specified in revolutions/sec are as follows:

Motor velocity $= Vm$, rev/sec
Ramp time $= Trs$, sec/Rs; Rs=ramp step

The ramp step distance in motor steps Drs is calculated as follows:

$$d = v \times t = Vm \times Trs =$$

$$Vm \frac{\text{rev}}{\text{sec}} \times Trs \frac{\text{sec}}{RS} = Vm \times Trs \frac{\text{rev}}{RS}$$

$d$ in degrees $= Dd =$ $$Vm \times Trs \frac{\text{rev}}{\text{sec}} \times 360 \frac{\text{deg}}{\text{rev}} = 360 \times Vm \times Trs \frac{\text{deg}}{RS}$$

The stepping motor resolution $= Dm$ deg/MS is specified in the motor manufacturer's specification.

$$Drs = Dd/Dm = 360 \times Vm \times Trs \frac{\text{deg}}{Rs} \times \frac{1}{Dm \text{ deg}/Ms}$$

$$\boxed{Drs = \frac{360 \times Vm \times Trs}{Dm} \quad \frac{\text{Motor steps}}{\text{Ramp step}}}$$

The ramp step divider Cn which is put into the timer/event counter is calculated by first calculating the number of MS/rev (MSr):

$$MSr = \frac{1}{Dm \text{ deg}/MS} \times 360 \frac{\text{deg}}{\text{rev}} = \frac{360}{Dm} \frac{MS}{\text{rev}}$$

The velocity in motor steps/sec Vss is:

$$Vss = MSR \times Vm =$$

$$\frac{360}{Dm} \frac{MS}{\text{rev}} \times Vm \frac{\text{rev}}{\text{sec}} = \frac{360 \times Vm}{Dm} \frac{MS}{\text{sec}}$$

The time for each motor step Tms is:

$$Tms = \frac{1}{Vss} = \frac{1}{360 \times Vm} \frac{\text{sec}}{MS}$$

The timer/event counter input clock fc will increment the counter by one count per input clock. Hence the counter divider Cn for a motor step is:

$$Cn = Tms \times fc = \frac{Dm}{360 \times Vm} \frac{\text{sec}}{MS} \times fc \frac{\text{counts}}{\text{sec}}$$

$$\boxed{Cn = \frac{Dm \times fc}{360 \times Vm} \quad \frac{\text{counts}}{MS}}$$

The above detailed description is, of course, not to be construed as defining the totality of the present invention. Numerous modifications and variations will become apparent to those skilled in the art from the foregoing. As such, the scope of the present patent is best determined by reference to the following claims.

I claim:

1. With respect to an apparatus for controlling a motor having two or more substantially identical windings, a method for fabrication and operating the apparatus, the method comprising the steps of:
   coupling an operative current sensing element in series with a first of the motor windings for operatively sensing current flow through the first winding;
   coupling a dummy sensing element in series with a second of the motor windings, the dummy sensing element being substantially identical to the operative sensing element so that respective current carrying circuits of the first and second motor windings are substantially identical;
   inserting first and second switches respectively in the current carrying circuits of the first and second windings for controlling current flow through the first and second windings;
   providing control means, operatively coupled to receive a feedback signal from the operative sensing element and to transmit switch opening and closing control signals to the first and second switches; and opening and closing both the first and second switches in response to the feedback signal in substantially identical manner such that substantially identical, although perhaps time-staggered, current waveforms will develop in the first and second windings.

2. The method of claim 1 further comprising the step of:
not coupling the control means to the dummy sensing element.

3. The method of claim 1 wherein the step of providing the control means comprises the steps of including in the control means, a single chip microprocessor having an onboard analog-to-digital converter and the step of connecting an analog input terminal of the analog-to-digital converter to the operative sensing element.

4. The method of claim 1 wherein the step of inserting first and second switches further comprises including a MOS transistor in each of the first and second switches.

5. The method of claim 1 wherein the motor has at least four substantially identical windings, the method further comprising:
coupling a third of the motor windings to the operative sensing element such that current flow through the third winding may be detected by the operative sensing element; and
coupling a fourth of the motor windings to the dummy sensing element such that the current carrying circuit of the fourth winding will be substantially identical to the current carrying circuit of the second winding.

6. A method for reducing component count in a control circuit which controls current flow through two or more substantially identical loads, the method comprising:
coupling an operative current sensor to a first of the loads for sensing current flow int he first load;
coupling a non-operative, dummy current sensor to a second of the loads, the dummy current sensor being substantially identical to the operative current sensor such that the combined load and sensor circuit of the first load is substantially identical to that of the second load;
coupling first and second control switches, respectively, tot he first and second loads;
measuring the magnitude of current flowing through the operative current sensor;
applying a first control signal to the first control switch, the first control signal being a function of the measured current magnitude, for restricting the magnitude of current in the first load below a predetermined level;
not measuring the magnitude of current flowing through the dummy current sensor and instead assuming the waveform of that current to be substantially identical to the waveform of current flowing through the operative current sensor; and
applying a second control signal to the second control switch, the second control signal having a waveform substantially identical to the first control signal, to thereby restrict the magnitude of current in the second load below the predetermined level.

7. The method of claim 6 wherein the first and second control signals are out of phase with each other.

8. The method of claim 6 comprising the step of including within the two or more substantially identical loads respective two or more windings of a motor.

9. The method of claim 6 further comprising:
converting the magnitude measured by the operative current sensor from an analog value to a digital value; and
supplying the digital value to a single chip microprocessor.

10. The method of claim 7 further comprising the step of providing an analog to digital converter circuit integrally on the single chip microprocessor wherein the converting step is carried out in the analog to digital converter circuit provided integrally on the single chip of the microprocessor.

11. In a method for controlling a plurality of substantially identical current-carrying circuits using feedback, the steps of:
coupling each of the current-carrying circuits to a control means for individually controlling currently flow through each of the current-carrying circuits, the control means having one or more feedback signal input terminals for receiving feedback signals from the current-carrying circuits and a plurality of control signal output terminals for outputting individual control signals to control respective ones of the current-carrying circuits;
selecting a subset of the current-carrying circuits as being representative of the other, nonselected current-carrying circuits;
transmitting one or more feedback signals from one or more of the selected circuits to a respective one or more input terminals of the control means while not transmitting similar feedback signals from the nonselected circuits;
developing, within the control means, a first control signal which is a function of one or more of the transmitted feedback signals for controlling current flow through one of the selected current-carrying circuits according to a predetermined control algorithm;
duplicating the waveform of the developed first control signal to generated a substantially identical although-perhaps out-of-phase second control signal; and
outputting the second control signal to one or more of the nonselected current-carrying circuits for controlling current flow through the one or more nonselected current-carrying circuits.

12. The method of claim 11 further including the steps of
coupling each of the selected circuits to an operative current sensor;
operatively coupling each operative current sensor to an input terminal of the control means;
coupling each of the nonselected circuits to a dummy current sensor; and
operatively isolating each dummy sensor from the feedback input terminals of the control means during feedback control.

13. With respect to an electrical circuit having first and second substantially identical loads and respective first and second switches for selectively coupling the first and second loads to a common power supply, a method for digitally controlling current flow through the first and second loads comprising:
repeatedly measuring at a predetermined sampling rate the magnitude of current flowing through the first load;
producing, in response to the measured current magnitudes of the first load, a first digital control signal for opening and closing the first switch so that the current magnitudes of the first load are constrained within a predetermined range;

not measuring the magnitude of current in the second load;

producing a second digital control signal which is a duplicate, although perhaps time-staggered replica, of the first digital control signal for opening and closing the second switch;

applying the first digital control signal to the first switch; and applying the second digital control signal to the second switch.

14. The method of claim 13 further comprising:

performing additional tasks in a time period equal to or less than a hypothetical time span that would be required for repeatedly measuring the magnitude of current flowing in the second load at a sampling rate at least equal to the predetermined sampling rate.

* * * * *